(No Model.)  2 Sheets—Sheet 1.

W. A. WILKINSON.
GANG TRIMMER.

No. 534,733.   Patented Feb. 26, 1895.

Witnesses.
J. Jessen
G. E. Purple

Inventor.
William A. Wilkinson
By Paul & Hawley
   att'ys.

(No Model.)
W. A. WILKINSON.
GANG TRIMMER.
No. 534,733.
Patented Feb. 26, 1895.
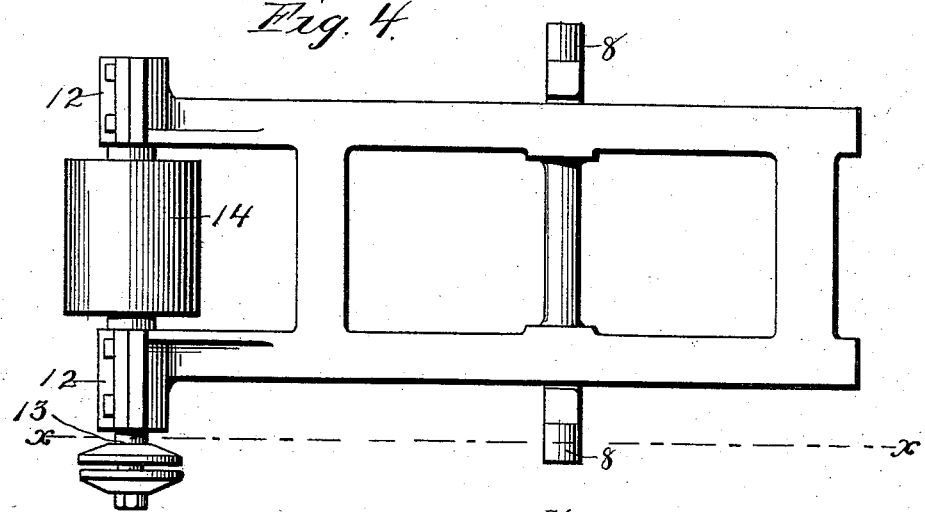
Fig. 4.
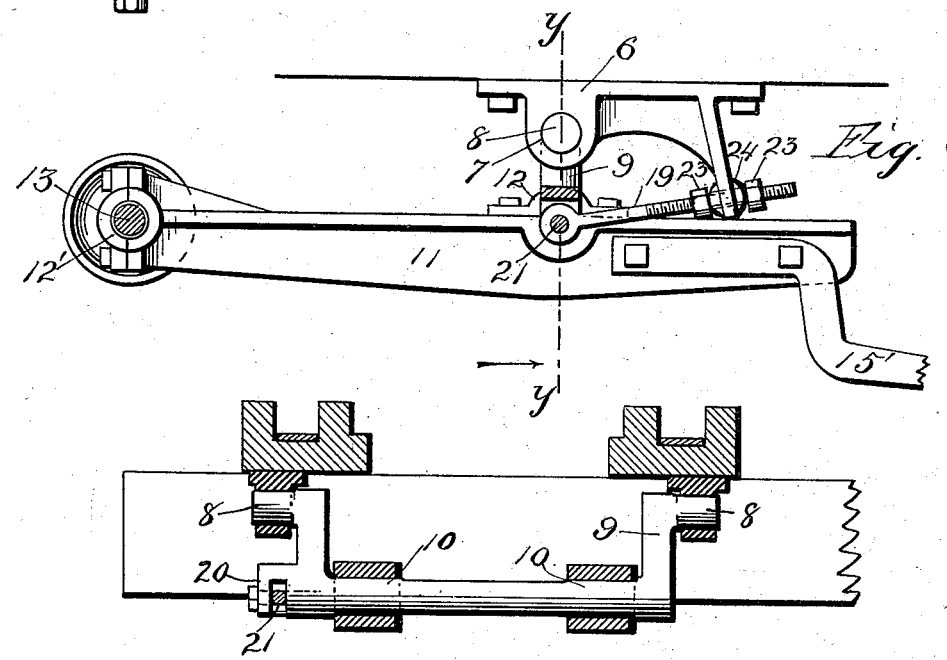
Fig. 3.
Fig. 5.
Witnesses
J. Jensen
G. E. Purple
Inventor
William A. Wilkinson
By Paul & Hawley Atty's

United States Patent Office.

WILLIAM A. WILKINSON, OF MINNEAPOLIS, MINNESOTA, ASSIGNOR TO HENRY H. SMITH AND ALVARADO RICHARDSON, OF SAME PLACE.

GANG-TRIMMER.

SPECIFICATION forming part of Letters Patent No. 534,733, dated February 23, 1895.

Application filed March 24, 1893. Serial No. 467,419. (No model.)

*To all whom it may concern:*

Be it known that I, WILLIAM A. WILKINSON, of the city of Minneapolis, county of Hennepin, State of Minnesota, have invented certain new and useful Improvements in Gang-Trimmers, of which the following is a specification.

My invention relates to gang trimmers, and in particular to means for hanging the saw yokes whereby the same are made adjustable, to the end that the several belts which operate the saws may be readily tightened.

My invention consists in the combination with the saw yoke, of the driving shaft and the drive pulley thereon, of a saw arbor journaled in said yoke and provided with the belt pulley, a belt extending over said pulley and over the drive pulley, a link hanger for said yoke, and means for swinging said link and for locking the same in any desired position, whereby the said belt may be loosened or tightened without removing the same from the pulleys or unlacing the belt; and the invention further consists in various details of construction and in combinations all as hereinafter described and particularly pointed out in the claims, all of which will be more readily understood by reference to the accompanying drawings, in which—

Figure 1:
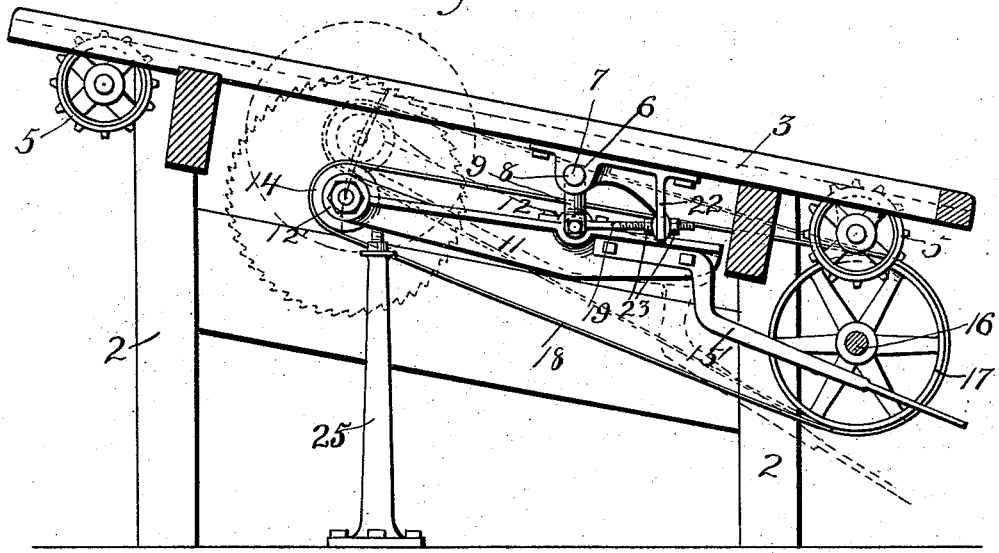
Figure 2:
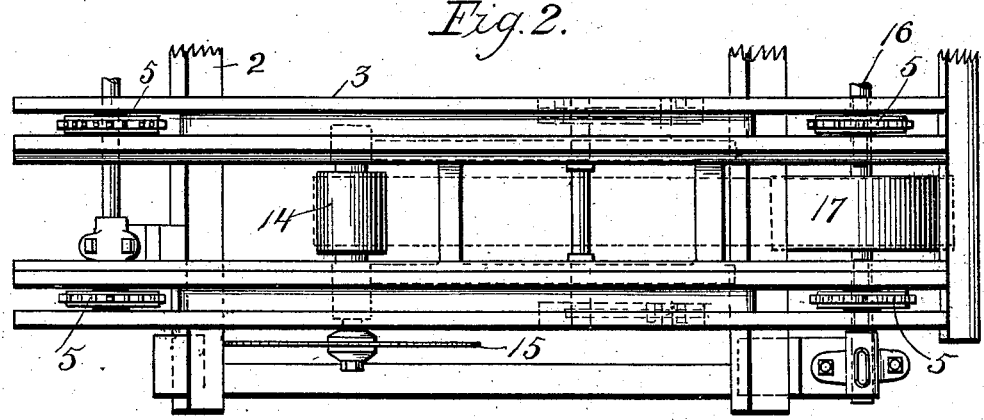

Figure 1 is a transverse sectional elevation of a gang trimmer embodying my invention. Fig. 2 is a plan view of a portion of the same. Fig. 3 is an enlarged detail side elevation of one of my devices, portions thereof being shown in section. Fig. 4 is a plan view thereof showing the section line upon which Fig. 3 is taken. Fig. 5 is a cross section on the line *y—y* of Fig. 3 and also shows the top timbers of the frame.

As shown in the drawings, 2 represents the frame of the machine provided with the usual inclined top 3. The arrangement of the toothed sprocket belts, not shown, which carry the board against the saws and operate over the sprocket wheels 5, is not altered from the ordinary practice. To the lower side of each pair of the top timbers of the frame, I attach two boxes or bearings 6, each having a journal 7 to receive an end 8 out of the crank shaft or link 9, as shown most clearly in Fig. 5. This link depends from the bearings and upon its cross shaft or lower part I provide bearing parts 10 upon which the saw yoke or frame 11 is pivoted by means of bearing boxes 12, the tops of which are removable. The yoke is of the usual construction and its forward ends have boxes 12' in which the saw arbor 13, bearing the wide pulley 14, is journaled. The cross-cut saw 15 is secured on the end of the arbor and is adapted to be raised through a slot in the top of the trimmer frame or bed. The saw yoke may be tilted to raise the saw in any of the well known ways, as by means of a treadle 15' extending from the rear end thereof. The main drive shaft 16 of the gang trimmer is secured in bearings attached to the frame, and upon the drive shaft a large drive pulley 17 is arranged for each circular saw of the trimmer.

As shown in Fig. 1, a belt 18 extends from the pulley 17 to the small pulley on the saw arbor, the upper side of the belt passing over the top of the saw frame. By swinging the link hanger forward this belt may be tightened upon the pulleys to prevent slippage, and for so adjusting the pivotal link and for locking the same in any desired position, I provide a threaded locking rod or spindle 19 provided with an eye secured in the hook 20 on the end of the link by a stud bolt 21, extending therethrough. The threaded end of the rod 19 passes through an opening in the lower end of the lug 22 which depends from the box 6, and the rod is adjustably secured therein by locking nuts 23, shown clearly in Figs. 1 and 3. To allow the spindle to swing slightly as the crank shaft or link hanger is moved forward or back during adjustment, I may provide a large opening in the lug 22 and by arranging the ball washers or bosses 24 upon the lug, secure a firm bearing for the inner sides of the locking nuts. The bearing for the saw frame is as shown, arranged close to the upper side of the belt 18 so that as the saw is raised the distance between the two pulleys will be increased and the belt tightened, while when the saw has dropped upon the stop post 25 the belt will be slackened and thus add greatly to the life of the belt.

Having thus described my invention, I claim as new and desire to secure by Letters Patent—

1. The combination, in a gang trimmer, of the bearing boxes 6, with the crank shaft or link pivoted in said boxes, the saw yoke pivoted on said crank shaft, the saw arbor, the pulley thereon, the main shaft and the main drive pulley, the belt 18 passing over said pulleys, a lever attached to one end of said saw yoke for tilting the same, a longitudinal adjusting rod or spindle 19 connected with said crank shaft and yoke, and an adjustable fastening for the opposite end of said rod, substantially as described.

2. The combination, in a gang trimmer, of the bearing boxes 6, with the crank shaft or link pivoted in said boxes, the saw yoke pivoted on said crank shaft, the saw arbor the pulley thereon, the main shaft and the main drive pulley the belt 18 passing over said pulleys, a lever attached to one end of said saw yoke for tilting the same, a longitudinal adjusting rod or spindle 19 connected with said crank shaft and yoke, an adjustable fastening for the opposite end of said rod, and a stop post arranged beneath said saw arbor and yoke, substantially as described and for the purpose specified.

3. The combination, with the gang trimmer frame, of the bearing boxes 6, one of which is provided with a lug 22, the crank shaft or link pivoted in said boxes, the saw yoke or frame provided upon said crank shaft, the hook upon said crank shaft, the stud bolt 21, the threaded spindle 19 having its ends secured in said lug, locking nuts arranged upon said spindle, the saw arbor journaled in the end of said yoke, the pulley arranged upon said arbor, the main shaft 16, the drive pulley thereon and the belt 18 passing over said pulleys and having its upper side nearest to said crank shaft, whereby said belt may be tightened by the raising or tilting of said saw yoke to raise the saw, substantially as described.

In testimony whereof I have hereunto set my hand this 21st day of March, 1893.

WILLIAM A. WILKINSON.

In presence of—
C. G. HAWLEY,
F. S. LYON.